(12) United States Patent
Vandike et al.

(10) Patent No.: US 8,800,538 B2
(45) Date of Patent: Aug. 12, 2014

(54) DIESEL FUEL SUPPLY CIRCUIT

(75) Inventors: Nathan R. Vandike, Geneseo, IL (US);
Michael W. Derew, Geneseo, IL (US);
Todd E. Van Hal, Eldridge, IA (US);
Garrick W. Herbst, Bettendorf, IA (US)

(73) Assignee: Deere & Company, Moline, IL (US)

( * ) Notice: Subject to any disclaimer, the term of this patent is extended or adjusted under 35 U.S.C. 154(b) by 286 days.

(21) Appl. No.: 13/455,452

(22) Filed: Apr. 25, 2012

(65) Prior Publication Data

US 2013/0284156 A1  Oct. 31, 2013

(51) Int. Cl.
*F02M 37/04* (2006.01)

(52) U.S. Cl.
USPC .......................................................... 123/541

(58) Field of Classification Search
USPC ............................................................ 123/541

IPC ................. F02M 31/20,37/0052, 53/043, 37/01
See application file for complete search history.

(56) References Cited

U.S. PATENT DOCUMENTS

| | | | |
|---|---|---|---|
| 5,887,572 A * | 3/1999 | Channing | 123/514 |
| 6,234,151 B1 | 5/2001 | Eck | |
| 6,457,460 B1 | 10/2002 | Doane et al. | |
| 2003/0005913 A1 | 1/2003 | Shelor et al. | |
| 2008/0196700 A1* | 8/2008 | Chyo et al. | 123/541 |
| 2011/0041812 A1* | 2/2011 | Chyo et al. | 123/541 |
| 2013/0255644 A1* | 10/2013 | Rieck et al. | 123/541 |

* cited by examiner

*Primary Examiner* — M. McMahon

(57) ABSTRACT

A diesel fuel supply circuit comprises a diesel engine (100); a fuel cooler (104); a fuel tank (102), and a valve (114). The valve (114) is operable to move the fuel cooler (104) from (1) a position within the circuit in which it cools fuel leaving the diesel engine (100) and going to the fuel tank (102) to (2) a position in which it cools fuel leaving the fuel tank (102) and going to the diesel engine (100) and vice versa.

16 Claims, 1 Drawing Sheet

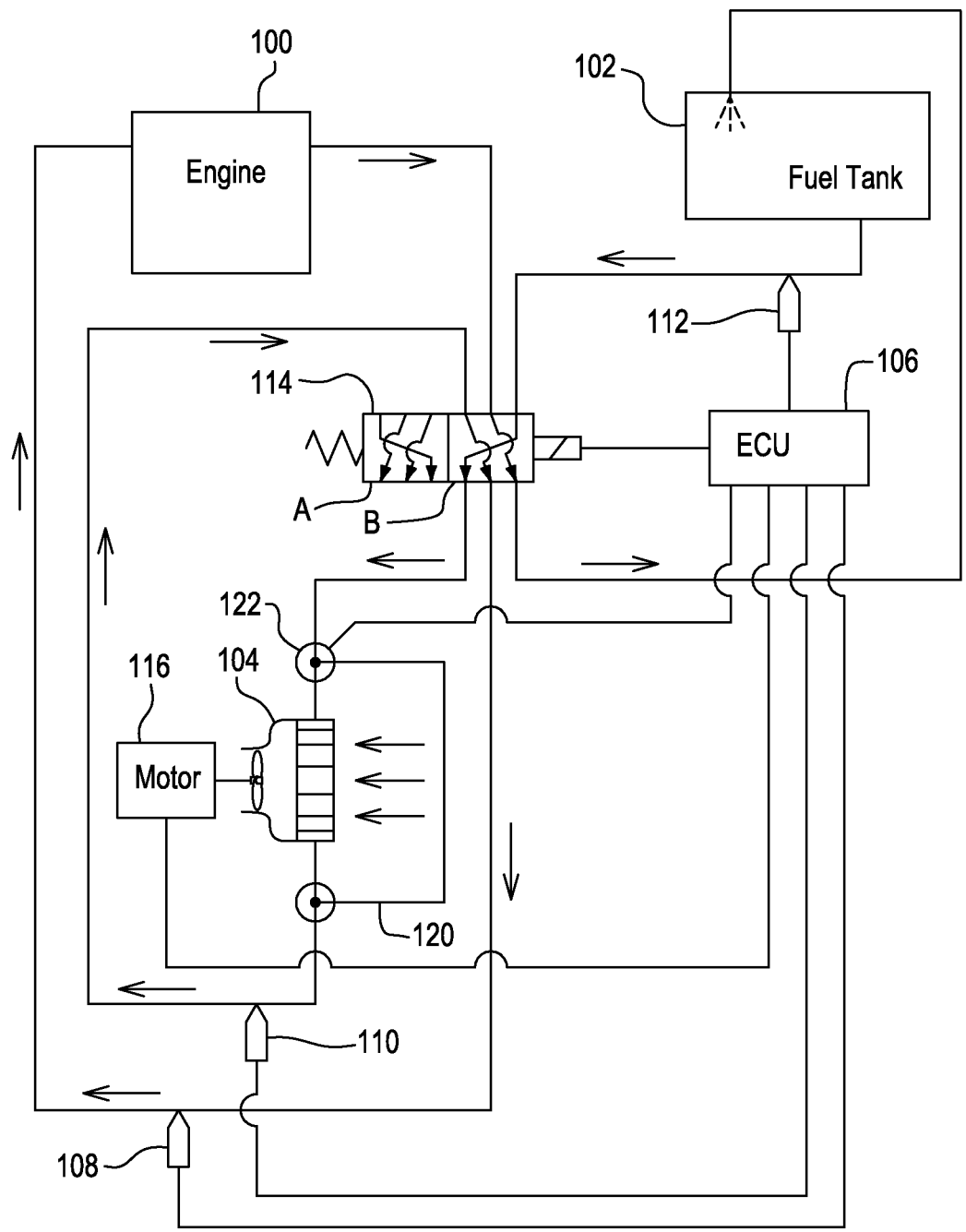

DIESEL FUEL SUPPLY CIRCUIT

FIELD OF THE INVENTION

This invention relates to diesel fuel supply circuits for work vehicles.

BACKGROUND OF THE INVENTION

In a typical diesel engine arrangement, a reservoir or tank is provided with diesel fuel that supplied to the diesel engine. A recirculating diesel fuel circuit extends between the engine and the fuel tank in which one fuel line extends from the fuel tank to the diesel engine to supply the engine with fuel, and another fuel line extends from the diesel engine back to the fuel tank to return overflow fuel to the tank.

Due to the great heat generated by the engine, a fuel cooler is usually provided to cool the fuel. Without a fuel cooler the diesel fuel may get so hot that it damages the injector pump or other components or causes the engine (through other controls) to "derate" or reduce its power output.

The fuel cooler is typically disposed to cool the overflow fuel that flows back from the engine to the fuel tank.

In US 2003/005913 A1, an arrangement for switching the location of a fuel cooler in a fuel supply circuit is shown. The fuel cooler is switched from cooling fuel exiting the internal combustion engine, to being removed from the fuel supply circuit entirely. This arrangement does not disclose a fuel cooler use to cool fuel flowing from a fuel tank to an engine. Furthermore, it does not disclose a cooler disposed between the engine and the fuel tank to cooled fuel exiting the engine and returning to the fuel tank.

In U.S. Pat. No. 6,457,460 B1, a cooler is provided to cool pressurized fuel as it travels in the opposite direction: from the fuel tank to the engine. The function is to extract heat from the fuel and thereby prevent the fuel from vaporizing.

In U.S. Pat. No. 6,234,151, two fuel coolers (19, 21) are shown disposed between the injectors and the fuel tank. One (21) is switched into the circuit to provide cooling when pressure at a valve (17) exceeds a predetermined value.

This may be inadequate in some arrangements, particularly when the fuel tank itself is in a hot environment and can absorb heat energy. In these cases, the fuel in the fuel tank may pick up enough heat after arriving in the tank that by the time the fuel returns to the engine it is too hot and cause engine damage, or derating (i.e. an automatic reduction in power) of the engine.

In a situation like this, it would be beneficial to have a fuel cooler disposed between the fuel tank and the engine. However, when the engine is cold, and the fuel is already below a preferred temperature, cooling the fuel from the fuel tank before it arrives at the engine may cause the fuel to get too cold and "gel".

Thus, if the fuel is hot, it may be beneficial to cool the fuel as it travels from the fuel tank to the engine. If the fuel is cold, it may be beneficial to cool the fuel as it travels from the engine to the fuel tank.

It would be beneficial to have a diesel fuel supply circuit that can alternatively position the fuel cooler between the engine and the fuel tank to cool the fuel in its return path to the tank, and to alternatively position the fuel cooler between the fuel tank and the engine to cool the fuel on its way from the fuel tank to the engine.

These benefits are provided by the arrangement described in claim 1. Further benefits are provided by the alternative arrangements described in the additional claims.

SUMMARY OF THE INVENTION

In accordance with one aspect of the invention, a fuel system for diesel engine is provided comprising an engine, a fuel cooler, a fuel tank, and a means for coupling the fuel cooler between the engine and the fuel tank in a first position in which the fuel cooler cools the fuel leaving the engine before it returns to the fuel tank and a second position in which the fuel cooler cools the fuel leaving the fuel tank before it returns to the engine.

In accordance with another aspect of the invention, a diesel fuel supply circuit is provided comprising: An engine having an engine fuel inlet and an engine fuel outlet; a fuel cooler having a cooler fuel inlet and a cooler fuel outlet; a fuel tank having a fuel tank inlet and a fuel tank outlet; and a valve coupled to the engine, the fuel cooler and the fuel tank, the valve having at least two configurations, the at least two configurations comprising a first configuration in which the valve couples the fuel cooler between the engine and the fuel tank to receive fuel from the engine fuel outlet and provide the fuel to the fuel tank inlet, and a second configuration in which the valve couples the fuel cooler between the fuel tank and the engine to receive fuel from the fuel tank outlet and provide fuel to the engine fuel inlet.

The valve may further couple the fuel tank outlet to the engine fuel inlet in the first configuration, and couple the engine fuel outlet to the fuel tank inlet in the second configuration.

The diesel fuel supply circuit may further comprise an ECU and at least one temperature sensor coupled to the ECU, and the at least one temperature sensor may be disposed to sense a temperature of the fuel in the diesel fuel supply circuit.

The at least one temperature sensor may include a temperature sensor disposed to sense the temperature of fuel entering the engine.

The at least one temperature sensor may include a temperature sensor disposed to sense the temperature of fuel leaving the fuel cooler.

The at least one temperature sensor may include a temperature sensor disposed to sense the temperature of fuel leaving the fuel tank.

The valve may be a spool valve having at least one spool movable in a valve body.

The spool may be shiftable between at least two positions, the at least two positions may comprise at least a first position corresponding to the first configuration, and at least a second position corresponding to the second configuration.

The diesel fuel supply circuit may further comprise a motor disposed to impel a secondary cooling fluid through the fuel cooler, wherein the ECU is configured to monitor the at least one temperature sensor, and to change the speed of the motor to reduce the cooling ability of the fuel cooler when the at least one temperature sensor indicates that a fuel temperature has reached a threshold temperature.

The at least one temperature sensor maybe a temperature sensor disposed to sense fuel temperatures at the inlet of the engine.

The ECU may be configured to monitor the at least one temperature sensor, and to shift the valve to the first configuration when the at least one temperature sensor indicates that the fuel temperature has reached a threshold temperature.

The at least one temperature sensor may be a temperature sensor disposed to sense the temperature of fuel at an outlet of the fuel tank.

The ECU may be configured to monitor the at least one temperature sensor, and to shift the valve to the second configuration when the at least one temperature sensor indicates that the fuel temperature has reached a threshold temperature.

The at least one temperature sensor may be a temperature sensor disposed to sense the temperature of fuel at an outlet of the fuel tank.

The ECU may be configured to monitor a temperature of fuel at the fuel tank and to shift the valve from the second configuration to the first configuration when the temperature of fuel at the fuel tank reaches a first threshold temperature, and to shift the valve from the first configuration to the second configuration when the temperature of fuel at the fuel tank reaches a second threshold temperature.

The first threshold temperature may be less than the second threshold temperature.

BRIEF DESCRIPTION OF THE DRAWING

The FIGURE is a schematic diagram of a diesel fuel supply circuit in accordance with present invention.

DETAILED DESCRIPTION

The FIGURE illustrates an engine 100, a fuel tank 102, a fuel cooler 104, an ECU 106, a temperature sensor 108, a temperature sensor 110, a temperature sensor 112, and a valve 114.

Valve 114 has two positions. In its first position, position "A", valve 114 directs overflow fuel that leaves the engine 100 to the fuel cooler 104. Valve 114 directs the fuel from the fuel cooler 104 to the fuel tank 102. Valve 114 directs the fuel from the fuel tank 102 to the engine 100.

This arrangement causes fuel to flow from the engine through the fuel cooler to be cooled, then to the tank, and then back to the engine. When the fuel temperature is elevated, such as when the engine has been operating for at least a warm-up period, this is the preferred location of the fuel cooler in the diesel fuel supply circuit.

In its second position, position "B", valve 114 directs overflow fuel that leaves the engine 102 to the fuel tank 102. Valve 114 directs the fuel from the fuel tank 102 to the fuel cooler 104. Valve 114 directs the fuel from the fuel cooler 104 to the engine 100.

This arrangement causes fuel to flow from the engine to the fuel tank then through the fuel cooler and back to the engine. When the fuel temperature is low, such as when the engine has just been started up, this is the preferred location of the fuel cooler in the diesel fuel supply circuit.

Valve 114 is controlled by the ECU 106, which is operatively coupled to the actuator for valve 114. The actuator is preferably a solenoid. Valve 114 is preferably a spool valve. The spool of valve 114 is shiftable between two positions, position "A" and position "B". These two positions correspond to the two locations of fuel cooler 104 within the circuit.

Fuel cooler 104 cools fuel by passing a secondary cooling fluid through a heat exchanger. The secondary cooling fluid (indicated by the three arrows in the FIGURE) is impelled through the heat exchanger by a fan driven by a motor 116. The motor 116 is coupled to the ECU 106 to be controlled thereby.

At the ECU's command, the speed of the motor 116 is changed and hence the rate of secondary cooling fluid flow through the heat exchanger is changed (both increased flow and decreased flow when the motor increases or decreases in speed, respectively) and hence the cooling provided by the fuel cooler is also changed. In this manner, ECU 106 can regulate the amount of cooling provided by the fuel cooler 104. Although the fuel cooler 104 is shown herein as having an ambient air cooled heat exchanger in which the air is drawn through the element of the fuel cooler 104 by a fan that in turn is driven by motor 116, the cooling media may be a liquid, and a pump for conveying the liquid instead of a motor and fan may be provided.

The ECU 106 has at least one temperature sensor coupled thereto that indicates to the ECU 106 what the fuel temperature is at at least one point in the diesel fuel supply circuit.

The at least one temperature sensor may include the temperature sensor 112 disposed to sense the temperature of the fuel leaving the fuel tank and signal that temperature to ECU 106. It may include the temperature sensor 110, which is disposed to sense the temperature of the fuel leaving the fuel cooler 104 and signal that temperature to the ECU 106. It may include the temperature sensor 108, which is disposed to sense the temperature of the fuel leaving the engine 100 and signal that to ECU 106.

ECU 106 comprises a digital microprocessor that is programmed to execute a sequence of digital instructions stored in a memory circuit. ECU 106 executes these instructions to perform the operations described herein. ECU 106 monitors one or more of the three temperature sensors 108, 110, 112 to determine the temperature of the fuel at various points in the circuit. Temperature sensor 108 is disposed at the inlet of the engine 100 to sense the temperature of fuel as it enters the engine 100. Temperature sensor 110 is disposed at the outlet of the fuel cooler 104 to sense the temperature of fuel as it exits the fuel cooler 104. Temperature sensor 112 is disposed at the outlet of the fuel tank 102 to sense the temperature of fuel is it exits the fuel tank 102.

The arrangement shown in the FIGURE may be operated in one or more modes of operation. These different modes of operation may be provided by programming the ECU 106 appropriately and storing the programmed instructions for operation of the ECU in an associated memory circuit.

In a first mode of operation, ECU 106 is programmed to monitor at least one of the three temperature sensors 108, 110, 112 and if ECU 106 determines that at least one temperature sensor has reached or is below a first threshold temperature, the ECU 106 is programmed to reduce the speed of (i.e. slowing down or shutting off) motor 116. In this way, the ECU 106 reduces or eliminates the cooling ability of the fuel cooler 104, effectively removing the fuel cooler 104 from the circuit. This is most useful when the engine is started and the fuel is uniformly cold. In this case, the ECU 106 preferably monitors temperature sensor 108 at the inlet of the engine. The first threshold temperature would be a fuel temperature near the gelling temperature at which any cooling of the fuel might lower the fuel temperature to a gelling temperature.

In an alternative configuration for reducing or eliminating cooling, a bypass circuit 120 provides a parallel fuel flow path around the fuel cooler 104. Flow through this flow path is controlled by a valve 122 which is selectively operated by ECU 106 to direct the fuel flow either through the fuel cooler 104 or through the bypass circuit 120 or through both in proportions that are determined by ECU 106.

In a second mode of operation, ECU 106 is programmed to monitor at least one of the three temperature sensors 108, 110, 112 and if ECU 106 determines that at least one temperature sensor has reached or is below a second threshold temperature, ECU 106 is programmed to shift the valve 114 to position "A" in which fuel cooler 104 is coupled into the fuel flow path extending between engine 100 and fuel tank 102 to cool the fuel flow going from engine 100 to fuel tank 102, and in which fuel cooler 104 is removed from the flow path extending between the fuel tank 102 and engine 100 such that it no longer cools the fuel flow going from fuel tank 102 to engine 100. In this case, the ECU 106 preferably monitors temperature sensor 108 at the inlet of the engine, or temperature sensor 112 at the outlet of the fuel tank 102. This position of the fuel cooler 104 is appropriate when the temperature is at a normal operating temperature, when the temperature of the fuel and the fuel tank is not excessive.

In a third mode of operation, ECU 106 is programmed to monitor at least one of the three temperature sensors 108, 110, 112, and if ECU 106 determines that at least one temperature sensor 108, 110, 112 is above the third threshold temperature, ECU 106 is programmed to shift valve 114 to position "B" in which fuel cooler 104 is coupled into the fuel flow path extending between engine 100 and fuel tank 102 to cool the fuel flow going from the fuel tank 102 to the engine 100, and in which fuel cooler 104 is removed from the flow path extending between the engine 100 and the fuel tank 102 such that it no longer cools the fuel flow going from the engine 100 to the fuel tank 102. This position of the fuel cooler 104 is appropriate when the temperature of the fuel in the fuel tank is excessive, and without additional cooling will damage the high pressure fuel pump in the engine.

In one preferred arrangement, the ECU 106 monitors the temperature of fuel at the fuel tank 102 using the temperature sensor 112, and when the temperature indicated by the temperature sensor 112 is above the third threshold temperature, the ECU 106 is configured to shift the valve 114 to the position "B" in which the fuel cooler 104 is disposed between the outlet of the fuel tank and the inlet of the engine. This prevents excessively heated fuel in the fuel tank from being communicated directly to the engine without first being cooled to a temperature that prevents are substantially reduces damage to the high pressure fuel pump in the engine.

Similarly in this arrangement, the ECU 106 monitors the temperature of fuel at the fuel tank 102 using the temperature sensor 112, and if the temperature indicated by the temperature sensor 112 is below the second threshold temperature (which has reached or is below the third threshold temperature), the ECU 106 is configured to shift the valve 114 to the position "A" to in which the fuel cooler 104 is disposed between the outlet of the engine and the inlet of the fuel tank. This is particularly beneficial when the vehicle is operating in an environment in which the fuel tank does not receive excessive heat energy directly from the environment, but receives substantially all of its heat from fuel passing through the engine and being returned to the fuel tank 102.

In the discussion above, we refer to an ECU 106 and a valve 114. It should be understood that this is the preferred arrangement. However, valve 114 as the term is used herein and in the claims may comprise a plurality of valve elements and valve bodies operating together to provide the capability described herein. Similarly, ECU 106 may comprise a plurality of digital microcontrollers or microprocessors coupled together using a communications circuit, for example a CAN bus. In the discussion above, we also refer to a fuel cooler 104.

The invention claimed is:

1. A diesel fuel supply circuit comprising:
an engine (100) having an engine fuel inlet and an engine fuel outlet;
a fuel cooler (104) having a cooler fuel inlet and a cooler fuel outlet;
a fuel tank (102) having a fuel tank inlet and a fuel tank outlet; and
a valve (114) coupled to the engine (100), the fuel cooler (104) and the fuel tank (102), the valve (114) having at least two configurations, the at least two configurations comprising a first configuration in which the valve (114) couples the fuel cooler (104) between the engine (100) and the fuel tank (102) to receive fuel from the engine fuel outlet and provide the fuel to the fuel tank inlet, and a second configuration in which the valve (114) couples the fuel cooler (104) between the fuel tank (102) and the engine (100) to receive fuel from the fuel tank outlet and provide fuel to the engine fuel inlet.

2. The diesel fuel supply circuit of claim 1, wherein the valve (114) further couples the fuel tank outlet to the engine fuel inlet in the first configuration, and wherein the valve (114) further couples the engine fuel outlet to the fuel tank inlet in the second configuration.

3. The diesel fuel supply circuit of claim 1 further comprising an ECU (106) and at least one temperature sensor (108, 110, 112) coupled to the ECU (106), wherein the at least one temperature sensor (108, 110, 112) is disposed to sense a temperature of the fuel in the diesel fuel supply circuit.

4. The diesel fuel supply circuit of claim 3 wherein the at least one temperature sensor (108, 110, 112) includes a temperature sensor (108) disposed to sense a temperature of fuel entering the engine (100).

5. The diesel fuel supply circuit of claim 3 wherein the at least one temperature sensor (108, 110, 112) includes a temperature sensor (110) disposed to sense a temperature of fuel leaving the fuel cooler (104).

6. The diesel fuel supply circuit of claim 3 wherein the at least one temperature sensor (108, 110, 112) includes a temperature sensor (112) disposed to sense a temperature of fuel leaving the fuel tank (102).

7. The diesel fuel supply circuit of claim 1, wherein the valve (114) is a spool valve having at least one spool movable in a valve body.

8. The diesel fuel supply circuit of claim 7 wherein the at least one spool is shiftable between at least two positions, the at least two positions comprising at least a first position corresponding to the first configuration, and further comprising at least a second position corresponding to the second configuration.

9. The diesel fuel supply circuit of claim 3, further comprising a motor (116) disposed to impel a secondary cooling fluid through the fuel cooler (104), wherein the ECU (106) is configured to monitor the at least one temperature sensor (108, 110, 112), and to change the speed of the motor to reduce the cooling ability of the fuel cooler (104) when the at least one temperature sensor (108, 110, 112) indicates that a fuel temperature has reached a threshold temperature.

10. The diesel fuel supply circuit of claim 9, wherein the at least one temperature sensor (108, 110, 112) is a temperature sensor (108) disposed to sense a fuel temperature at the inlet of the engine.

11. The diesel fuel supply circuit of claim 3, wherein the ECU (106) is configured to monitor the at least one temperature sensor (108, 110, 112), and to shift the valve (114) to the first configuration when the at least one temperature sensor (108, 110, 112) indicates that the fuel temperature has reached a threshold temperature.

12. The diesel fuel supply circuit of claim 11, wherein the at least one temperature sensor (108, 110, 112) comprises a temperature sensor (112) disposed to sense a temperature of fuel at an outlet of the fuel tank (102).

13. The diesel fuel supply circuit of claim 3, wherein the ECU (106) is configured to monitor the at least one temperature sensor (108, 110, 112), and to shift the valve (114) to the second configuration when the at least one temperature sensor (108, 110, 112) indicates that the fuel temperature has reached a threshold temperature.

14. The diesel fuel supply circuit of claim 13, wherein the at least one temperature sensor (108, 110, 112) is a temperature sensor (112) disposed to sense a temperature of fuel at an outlet of the fuel tank (102).

15. The diesel fuel supply circuit of claim 3, wherein the ECU (106) is configured to monitor a temperature of fuel at the fuel tank (102) and to shift the valve (114) from the second configuration to the first configuration when the temperature of fuel at the fuel tank (102) reaches a first threshold temperature, and to shift the valve (114) from the first configuration to the second configuration when the temperature of fuel at the fuel tank (102) reaches a second threshold temperature.

16. The diesel fuel supply circuit of claim 15 wherein the first threshold temperature is less than the second threshold temperature.

* * * * *